(12) United States Patent
Muraleedharan et al.

(10) Patent No.: US 10,212,215 B2
(45) Date of Patent: Feb. 19, 2019

(54) APPARATUS AND METHOD FOR PROVIDING METADATA WITH NETWORK TRAFFIC

(71) Applicant: Samsung Electronics Co., Ltd., Suwon-si, Gyeonggi-do (KR)

(72) Inventors: Anurag Muraleedharan, Santa Clara, CA (US); Balasubrahmanyam Gattu, Cupertino, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 181 days.

(21) Appl. No.: 14/613,793

(22) Filed: Feb. 4, 2015

(65) Prior Publication Data

US 2015/0229704 A1  Aug. 13, 2015

Related U.S. Application Data

(60) Provisional application No. 61/938,430, filed on Feb. 11, 2014.

(51) Int. Cl.
*G06F 15/16* (2006.01)
*H04L 29/08* (2006.01)
*H04L 12/46* (2006.01)

(52) U.S. Cl.
CPC .......... *H04L 67/10* (2013.01); *H04L 12/4633* (2013.01); *H04L 12/4641* (2013.01); *H04L 67/141* (2013.01)

(58) Field of Classification Search
CPC . H04L 67/10; H04L 12/4633; H04L 12/4641; H04L 63/00; H04L 67/141

USPC ........................................................ 709/217
See application file for complete search history.

(56) References Cited

U.S. PATENT DOCUMENTS

| | | | |
|---|---|---|---|
| 2003/0014521 A1* | 1/2003 | Elson | G06F 9/5011 709/225 |
| 2007/0174362 A1* | 7/2007 | Pham | G06F 21/6209 |
| 2011/0004698 A1 | 1/2011 | Wu | |
| 2011/0047597 A1 | 2/2011 | Mahaffey et al. | |
| 2011/0153351 A1* | 6/2011 | Vesper | G06Q 10/10 705/2 |
| 2013/0097308 A1* | 4/2013 | Le | H04L 67/22 709/224 |
| 2015/0358391 A1* | 12/2015 | Moon | H04L 67/10 709/224 |

FOREIGN PATENT DOCUMENTS

| | | |
|---|---|---|
| WO | 2008/062169 A1 | 5/2008 |
| WO | 2013/055421 A1 | 4/2013 |

\* cited by examiner

*Primary Examiner* — Sm A Rahman
(74) *Attorney, Agent, or Firm* — Jefferson IP Law, LLP

(57) ABSTRACT

An apparatus and method for providing metadata with network traffic are provided. The method includes generating, at an electronic device, a network tunnel between an electronic device and at least one external electronic device that communicates with the electronic device via a communication network, and receiving data, including metadata of applications generating the received data, associated with one or more applications from the external electronic device via the network tunnel.

21 Claims, 6 Drawing Sheets

APPARATUS AND METHOD FOR PROVIDING METADATA WITH NETWORK TRAFFIC

CROSS-REFERENCE TO RELATED APPLICATION(S)

This application claims the benefit under 35 U.S.C. § 119(e) of a U.S. Provisional application filed on Feb. 11, 2014 in the U.S. Patent and Trademark Office and assigned Ser. No. 61/938,430, the entire disclosure of which is hereby incorporated by reference.

TECHNICAL FIELD

The present disclosure relates to an apparatus and method for providing metadata with network traffic.

BACKGROUND

Telecommunications and data networking have been developed to provide communication and information exchange services between users. As user demand for networking technology and network services have increased, telecommunications and data networking services have been further developed and researched and a variety of technologies, such as internet protocol (IP) networking, Ethernet networking, and virtual private network (VPN) technology have been used to provide end users with better network services. As network services, network applications, and network devices and/or entities are designed to use increasing amounts of bandwidth and processing resources to provide new and/or improved network services, virtual networks and/or virtual network entities have been developed to provide improved network services over data networks.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for providing a tunnel (TUN), such as a network tunnel of a Virtual Private Network (VPN) or other types of networks, for transmitting and receiving network traffic, and providing metadata with network traffic.

In accordance with an aspect of the present disclosure, a method for providing metadata with network traffic is provided. The method includes generating, at an electronic device, a network tunnel between an electronic device and at least one external electronic device that communicates with the electronic device via a communication network, and receiving data, including metadata of applications generating the received data, associated with one or more applications from the external electronic device via the network tunnel.

In accordance with an aspect of the present disclosure, a method for providing metadata with network traffic is provided. The method includes determining whether an application that is executed on the electronic device requests a network TUN connection to another electronic device, transmitting a request for the network TUN connection to the other electronic device if the network TUN is requested, receiving, from the other electronic device, a response to request for the network TUN, generating, by the electronic device, a network TUN between the electronic device and the other electronic device according to the response, and at least one of transmitting data or receiving data, including metadata, associated with at least one application of the other electronic device via the network TUN, wherein the metadata is based on at least one of the application that is executed on the electronic device or the at least one application of the other electronic device.

In accordance with another aspect of the present disclosure, an electronic device for providing metadata with network traffic is provided. The electronic device includes a controller configured to generate a network tunnel between the electronic device and at least one external electronic device that communicates with the electronic device via a communication network, and a communication interface unit configured to receive data, including metadata of applications generating the received data, associated with one or more applications from the external electronic device via the network tunnel.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
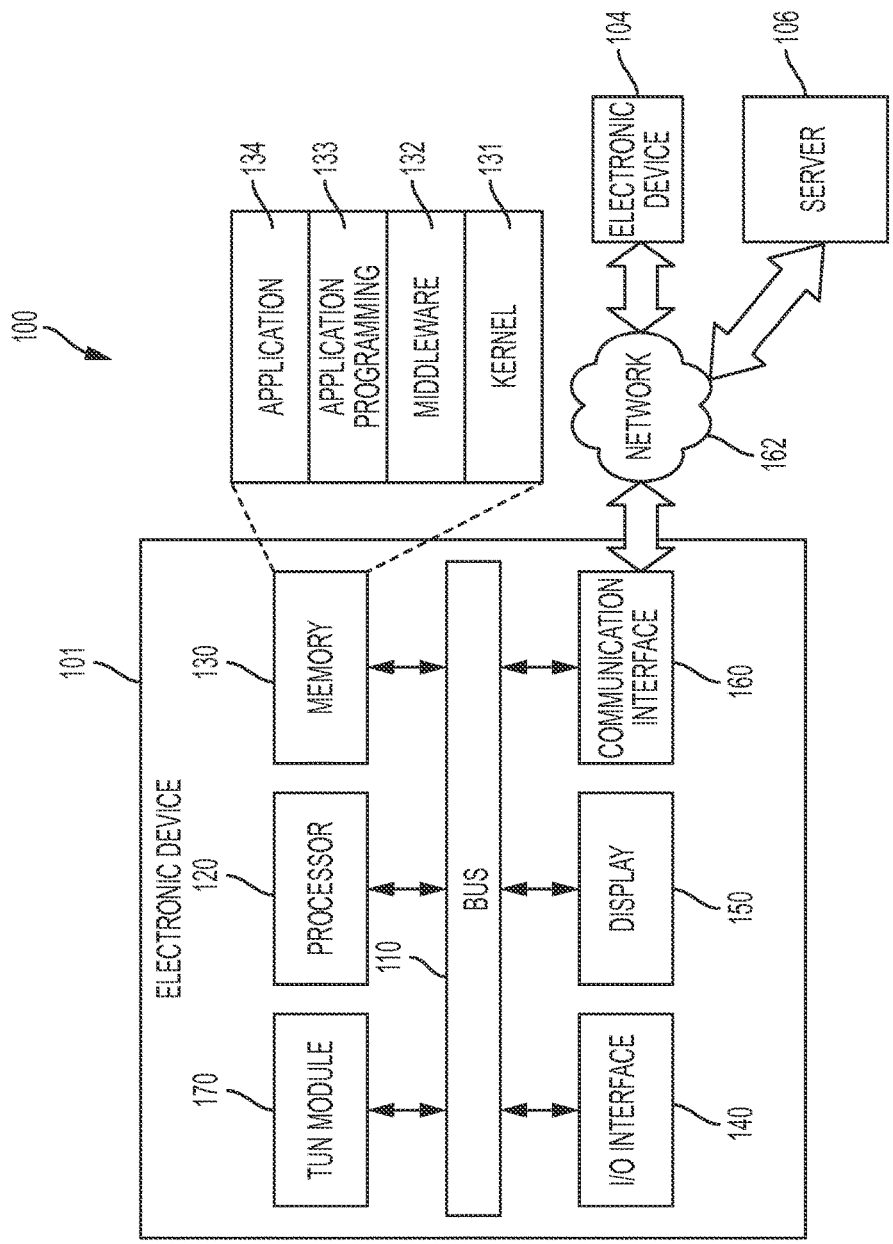
FIG. 1 illustrates a network environment including an electronic device according to an embodiment of the present disclosure.

Detailed descriptions of various aspects of the present disclosure will be discussed below with reference to the attached drawings. The descriptions are set forth as examples only, and shall not limit the scope of the present disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Terms as used in the present disclosure are used to describe the various embodiments of the present disclosure, and are not intended to limit the present disclosure. Singular terms are intended to include plural forms, unless the context makes it clear that plural forms are not intended.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an Motion Pictures Expert Group (MPEG) audio layer 3 (MP3) player, a mobile medical device, a camera, a wearable device, e.g., a head-mounted device (HMD), electronic clothes, electronic braces, an electronic necklace, an electronic accessory, an electronic tattoo, or a smart watch, and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box, e.g., Samsung HomeSync™, Apple TV™, or Google TV™, a gaming console, an electronic dictionary, an electronic key, a camcorder, an electronic picture frame, and/or the like.

According to various embodiments of the present disclosure, an electronic device may be a medical device, e.g., a magnetic resonance angiography (MRA) device, a magnetic resonance imaging (MRI) device, computed tomography (CT) device, an imaging device, or an ultrasonic device, a navigation device, a global positioning system (GPS) receiver, an event data recorder (EDR), a flight data recorder (FDR), an automotive infotainment device, a naval electronic device, e.g., a naval navigation device, a gyroscope, or a compass, an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices, e.g., water, electricity, gas or electro-magnetic wave measuring devices, and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

To provide network services, kernel-bypass networking, which may also be referred to as userspace networking, may be used. In userspace networking, control of Ethernet hardware, which is included in a data network, may be provided, for example, by userspace processes of an operating system (OS) rather than by kernelspace processes, e.g., processes that are executed only by a closely managed portion of the OS, such as a kernel. The userspace processes may be executed in a portion of system memory, and/or a portion of virtual memory of the OS, allocated for user service, such as user applications, programs, and services that are executed by the OS according to instructions provided by a user of the OS.

A tunnel (TUN), which may also be referred to as a network tunnel, may be a virtual-network kernel device that may be implemented entirely in software, implemented using a processor, a controller, and/or other similar hardware elements of a terminal connected to a network, or implemented in a combination of software and hardware. The TUN may provide network layer services. For example, the TUN may simulate a virtual network layer device that operates on network layer packets, such as IP packets and/or layer 3 packets, wherein layer 3 refers to a third layer of the open system interconnection (OSI) model of a communication system.

In further detail, telecommunications and data networking services may be provided by using a TUN, such as a virtual tunnel, provided in a VPN, which may communicatively connect two points, elements, and/or entities of a communication network. However, using a TUN may strip metadata, which may include information regarding various characteristics, features, configurations, settings, and or other similar and/or suitable types of information, from data, such as network traffic packets, that is transmitted via the TUN. Accordingly, there is a need for a TUN driver that provides metadata along with network traffic packets and/or data transmitting via the TUN.

In further detail a TUN interface, e.g., a virtual network interface, may capture all network traffic being transmitted by a device before reaching an actual physical interface of the device. A related-art VPN application, e.g. a Cisco VPN application, may be listening for, and/or detecting, packets reaching the TUN interface, and thus, packets that are supposed to go out via internet are now captured by the Cisco application. The related-art VPN application may encrypt the network packets and transmit the encrypted network packets over the actual physical interface connected to a network, e.g. transmit the encrypted network packets to the internet. However, before the encrypted network packets are sent via the actual physical interface connected to the network, the related-art VPN application discards user identifier (UID) and process identifier (PID) information and sends the encrypted network packets after stripping the UID and the PID information from the captured network traffic. In other words, encrypted network packets travelling over the internet will not have a UID and a PID. In contrast, a VPN application according to an embodiment of the present disclosure, may receive and/or use, or in other words, may include, a UID and a PID of an application which originates and/or generates the network traffic that is to be captured by the VPN application. Accordingly, a VPN application, according to an embodiment of the present application, may treat packets differently based on originator.

While the present disclosure may describe various embodiments by referring to a TUN driver or a TUN module, the present disclosure is not limited thereto, and other types of software/hardware implementations that may provide network tunneling functionality may also be used.

To provide the TUN, a TUN driver that includes a TUN interface may be provided. An example TUN interface may remove metadata associated with a network packet prior to, for example, allocating userspace resources to a userspace application that attempts to use the TUN provided by the TUN interface. The metadata, for example, may include information that may be used in processing network traffic.

For example, the TUN driver may be provided as follows: Example Code of a TUN Driver According to the Present Disclosure

```
/* Put packet to the user space buffer */
static ssize_t tun_put_user(struct tun_struct *tun,
                struct tun_file *tfile,
                struct sk_buff *skb,
                const struct iovec *iv, int len){
    struct tun_pi pi = { 0, skb->protocol };
    ssize_t total = 0;
    int vlan_offset = 0;
    if (!(tun->flags & TUN_NO_PI)) {
        if ((len -= sizeof(pi)) < 0)
            return -EINVAL;
        if (len < skb->len) {
            /* Packet will be striped */
            pi.flags |= TUN_PKT_STRIP;      }
        if (memcpy_toiovecend(iv, (void *) &pi, 0, sizeof(pi)))
            return -EFAULT;
        total += sizeof(pi);
    }
// remaining implementation of function
}
```

The example TUN interface described above may be included in a TUN driver which may be provided, for example, by a VPN vendor application, e.g., an application in the user space, that listens, e.g., monitors, for packets on the TUN interface. As described above, the example TUN interface may remove metadata which may include traffic packet origination application information, e.g., information related to and/or indicating an origination application of a respective traffic packet. Thus, such a VPN vendor application may not perform, for example, traffic operations, such as quality of service (QoS), based on an originator, the origination application, or any other similar and/or suitable characteristics and/or information of a respective traffic packet.

FIG. 1 illustrates a network environment including an electronic device according to various embodiments of the present disclosure.

Referring to FIG. 1, a network environment 100 may include an electronic device 101, a network 162, an electronic device 104, and a server 106. The electronic device 101 may include a bus 110, a processor 120, a memory 130, an input/output (I/O) interface 140, a display 150, a communication interface 160, and a TUN module 170.

The bus 110 may be circuitry that connects the foregoing components and allows communication, such as data communication, sending and/or receiving of control messages, or any other similar and/or suitable type of communication between the foregoing components.

The processor 120 may, for example, receive instructions from other components, such as the memory 130, the I/O interface 140, the display 150, communication interface 160 or the TUN module 170, and may interpret the received instructions and execute computation and/or data processing according to the interpreted instructions.

The memory 130 may, for example, store instructions or data that are received from, or generated by, other components included in the electronic device 101 and external to the electronic device 101, such as the memory 130, the I/O interface 140, the display 150, the communication interface 160, and/or the TUN module 170. For example, the memory 130 may include programming modules such as a kernel 131, a middleware 132, an application programming interface (API) 133 or an application 134. Each of the foregoing programming modules may include a combination of at least two of software, firmware and hardware.

The kernel 131 may control and/or manage system resources, such as the bus 110, the processor 120 and/or the memory 130, that may be used in executing operations or functions implemented in other programming modules such as, for example, a middleware 132, an API 133 and/or an application 134. Also, the kernel 131 may provide an interface for allowing the middleware 132, the API 133, and/or the application 134 to access individual components of the electronic device 101.

The middleware 132 may be used by the kernel 131 to communicate with the API 133 and/or the application 134 to send and receive data. Also, the middleware 132 may control work requests, or in other words, perform scheduling, load balancing, and/or similar operations with respect to the work requests by one or more applications 134 by, for example, assigning priorities for using system resources, such as the bus 110, the processor 120 and/or the memory 130, of the electronic device 101 to the one or more applications 134.

The API 133 is an interface that may control functions that the application 134 may provide at and/or to the kernel 131 and/or the middleware 132. For example, the API 133 may include at least an interface or function, such as a command, for file control, window control, video processing or character control.

According to various embodiments, the application 134 may include an SMS/MMS application, an email application, a calendar application, an alarm application, a health care application, such as an exercise amount and/or blood sugar level measuring application, an environmental information application, such as an application that may provide atmospheric pressure, humidity and/or temperature information, and/or any other similar and/or suitable types of applications. In addition, the application 134 may be an application that is associated with information exchange between the electronic device 101 and an external electronic device, such as the electronic device 104. The application that is associated with the information exchange may include, for example, a notification relay application, which provides the external electronic device with certain type of information, or a device management application that manages the external electronic device.

For example, the notification relay application may include functionality that provides a notification generated at the electronic device 101 by other applications, such as an SMS/MMS application, an email application, a health care application or an environmental information application, to an external electronic device, such as the electronic device 104. In addition, the notification relay application may provide, for example, a receive notification from an external electronic device, such as the electronic device 104, and provide the receive notification to a user. The device management application may manage, for example, enabling or disabling of functions associated with least a portion of an external electronic device, such as the external electronic device itself, and/or one or more components of the external electronic device, in communication with the electronic device 101, controlling of brightness and/or resolution of a display of the external electronic device, an application operated and/or executed by the external electronic device, or a service, such as a voice call service and/or a messaging service, provided by the external electronic device.

According to various embodiments, the application 134 may include, for example, one or more applications that are determined according to a property, such as a type of an electronic device, of the external electronic device, which may be the electronic device 104. For example, if the external electronic device is a MP3 player, the application 134 may include one or more applications related to music playback. In another example, if the external electronic device is a mobile medical device, then the application 134 may be the health care-related applications. According to an embodiment, the application 134 may include at least one of an application that is preloaded at the electronic device 101 or an application that is received from an external electronic device, such as the electronic device 104 or the server 106.

The I/O interface 140, for example, may receive an instruction and/or data from a user and may send, via the bus 110, the instruction and/or the data to the processor 120, the memory 130, the communication interface 160 and/or the TUN module 170. For example, the I/O interface 140 may provide data associated with a user input received via a touch screen to the processor 120. Also, the I/O interface 140 may, for example, output instructions and/or data received via the bus 110 from the processor 120, the memory 130, the communication interface 160 and/or the TUN module 170, via an I/O device, such as a speaker, a display, or any other similar and/or suitable I/O device. For example, the I/O interface 140 may output voice data processed using the processor 120, via a speaker.

The display 150 may display various types of information, such as multimedia data, text data, or any other similar and/or suitable type of displayable data, to the user.

The communication interface 160 may provide communication between the electronic device 101 and at least one external electronic device, such as the electronic device 104 or the server 106. For example, the communication interface 160 may communicate with the external electronic device by establishing a connection with the network 162 using wireless and/or wired communication. The wireless communication may be at least one of, for example, Wi-Fi communication, Bluetooth communication, near field communication (NFC), global positioning system (GPS) signaling, cellular communication, such as long term evolution (LTE) communication, LTE-A communication, code division multiple access (CDMA) communication, wideband CDMA (WCDMA) communication, universal mobile telecommunication system (UMTS) communication, wireless broadband (WiBro), global system for mobile (GSM) communication, or any other similar and/or suitable type of cellular communication. The wired communication may be at least one of, for example, universal serial bus (USB) communication, high definition multimedia interface (HDMI) communication, recommended standard-232 (RS-232), serial communication, plain old telephone service (POTS), or any other similar and/or suitable type of wired communication.

According to various embodiments, the network 162 may be telecommunications network, data network, or any other similar and/or suitable network including electronic devices. The network 132 may include at least one of, for example, a computer network, the Internet, a telephone network, or any other similar and/or suitable type of network. According to an embodiment, a communication protocol, such as a transport layer protocol, a data link layer protocol, a physical layer protocol, or any other similar and/or suitable communication protocol for communicating between the electronic device 101 and an external electronic device may be supported by, for example, at least one of the application 134, the API 133, the middleware 132, the kernel 131, the communication interface 160, or any other similar and/or suitable element included in the electronic device 101.

The TUN module 170 may, for example, process at least a part of information received from other components, such as the processor 120, the memory 130, the I/O interface 140, the communication interface 160, or any other similar and/or suitable element included in the electronic device 101. For example, the TUN module 170 may control, via the processor 120, independently, and/or directly, at least some of the functions, operations, and/or elements of electronic device 101 to communicate and/or connect to another electronic device, such as the electronic device 104 or the server 106, by forming a TUN. In other words, the TUN module 170 may form a TUN, such as a virtual tunnel, a tunnel used in a VPN, or any other similar and/or suitable type of tunnel that is used to communicate between two devices, elements, and/or network locations included in a communication network.

The TUN module 170 may be used to generate a TUN between two devices, elements, and/or network locations included in and/or connected to the network 162. The TUN module 170 may include, for example, driver which may be implemented according to the following example embodiment provided below.

An Example Network Tunnel Driver According to an Embodiment of Present Disclosure is Provided Below:

```
/* Metadata header structure. */
struct tun_meta_header {
        /* struct sk_buff.mark */
        u32 uid, pid;
};
/* Put packet to the user space buffer */
static ssize_t tun_put_user(struct tun_struct *tun,
                struct tun_file *tfile,
                struct sk_buff *skb,
                const struct iovec *iv, int len){
    if (tun->flags & TUN_META_HDR) {
        struct tun_meta_header meta = { 0 };
        meta.uid = skb ->uid;
        meta.pid = current ->pid;
```

-continued

```
        if (memcpy_toiovecend(iv, (void *) (void *)&meta
            , 0, sizeof(meta)))
                return −EFAULT;
        total += sizeof(pi);
    }
    // remaining implementation of function as in original driver
    }.
```

Various embodiments of the present disclosure is not limited to the above example TUN driver, and other implementations that may create a network tunnel that maintain metadata associated with network traffic may also be used.

Figure 2:
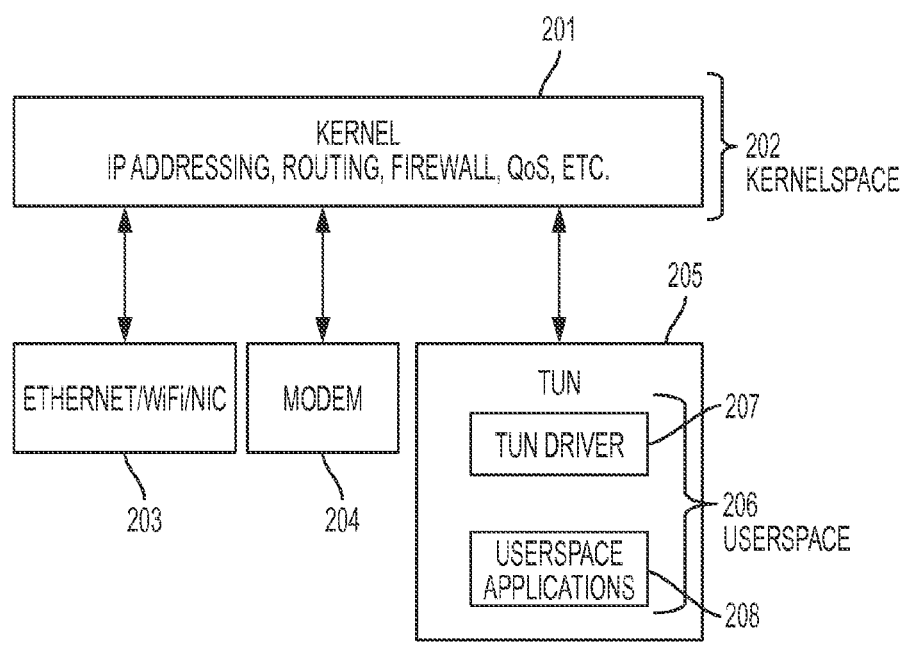
FIG. 2 illustrates an electronic device according to an embodiment of the present disclosure.

FIG. 2 illustrates an electronic device according to an embodiment of the present disclosure.

Referring to the FIG. 2, the electronic device 101 includes a kernel 201 corresponding to a kernelspace 202, an Ethernet/Wi-Fi/network interface card (NIC) unit 203, which may be similar to the communication interface 160 (see FIG. 1), a modem 204, and a TUN module 205, which may be similar to the TUN module 170 (see FIG. 1). The TUN module 205 may include a TUN driver 206 and one or more userspace applications 210 corresponding to a userspace 206. The one or more userspace applications 210 may communicate using a TUN implemented using the TUN module 205. The kernel 201 may, for example, perform IP addressing, routing, firewall services, QoS, and the like.

According to an embodiment of the present disclosure, a TUN driver 207 may provide metadata included with network traffic received at the electronic device to the userspace 206. The kernel 201, which may also be referred to as a kernel module 201, for example, may be configured to provide the metadata in the traffic to the userspace 206. The metadata may include, for example, a UID and/or a PID. Other types of data that may identify the originator and/or the type of traffic may be provided instead of, or in addition to the UID and/or PID.

Using the metadata, applications, such as the application 134 included in the electronic device 101, may receive the traffic related to VPN vendor applications, or any other similar and/or suitable applications, including applications other than the VPN vendor application. The electronic device 101 may differentiate the traffic based on the originator, for example, according the UID and/or the PID included in the metadata received with the traffic, and may support various services or features such as, for example, QoS, or special encryption. Additionally, other logic specific to each originating application of the traffic and/or the traffic may also be provided via the metadata. For example, traffic that does not require encryption, e.g., streaming video traffic, may be distinguished from traffic that requires encryption in order to be processed differently. The metadata may be used to send different traffic to different endpoints according to the applications, i.e., the originators, which are associated with the traffic.

According to various embodiments of the present disclosure, metadata, such as the UID and/or the PID of originator application, and/or other types of data that may identify the originator application or the type of traffic, may be provided in the traffic as parameters. For example, a metadata header provided to a network tunnel driver, which may be both a TUN driver and a network tap (TAP) driver, or in other words, a TUNTAP driver, may be used to pass sk_buff information to the userspace. The sk_buff information may be configured to include fields corresponding to the information of the metadata. For example, the metadata may include fields for the UID, such as a field skb->uid, and the PID, such as a field current->pid, and the fields may be provided in the sk_buff information. Additional fields may also be provided for additional information that may be included in the metadata. While the above description refers to the use of socket buffers and/or sk_buff information, other types of data structures or methods may also be used to provide metadata along with network traffic to the userspace.

Figure 3:
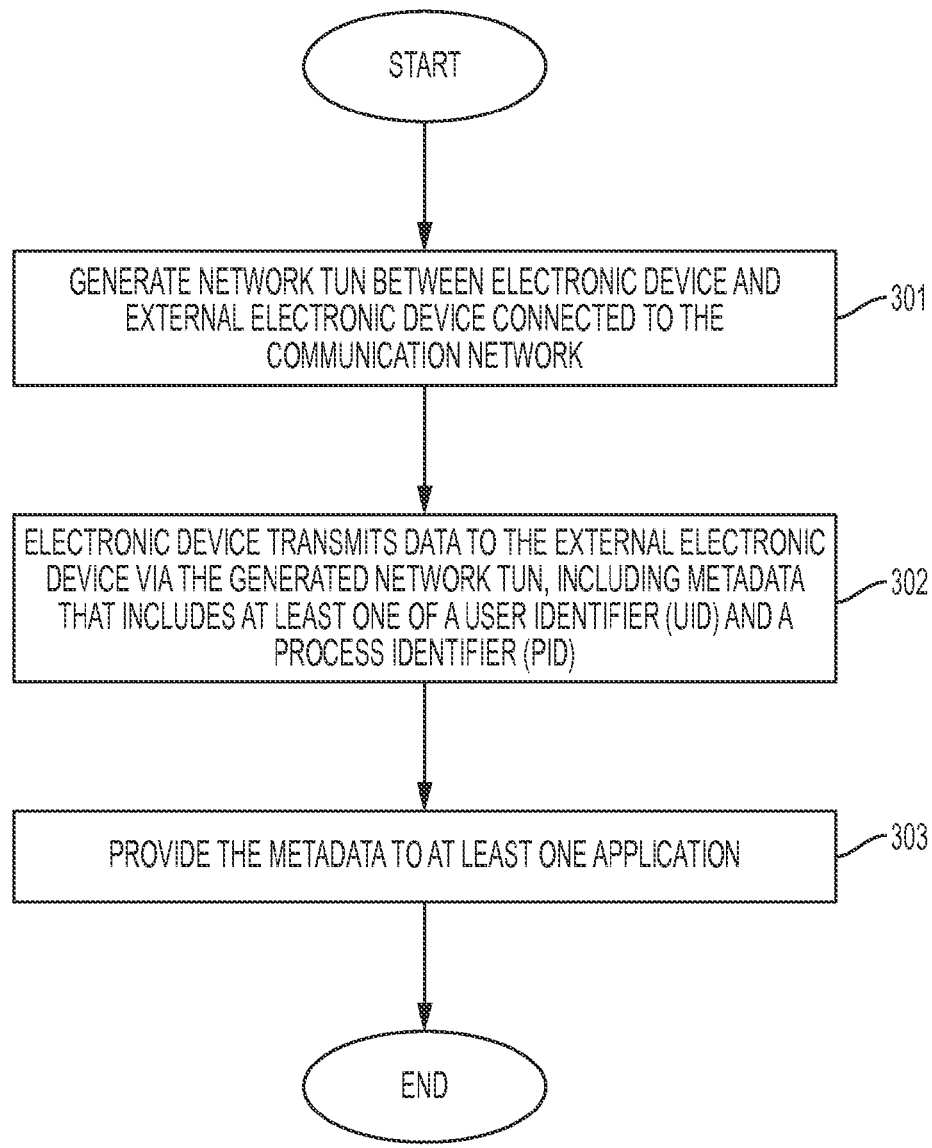
FIG. 3 is a flowchart illustrating a method of providing metadata over a network tunnel (TUN) according to an embodiment of the present disclosure.

FIG. 3 is a flowchart illustrating a method of providing metadata over a network tunnel (TUN) according to an embodiment of the present disclosure.

Referring to FIG. 3, the method for providing the metadata in the network TUN may be executed by an electronic device 300, which may be similar to the electronic device 101, which includes the TUN module 170. At operation 301, the TUN driver may generate a network TUN between the electronic device and at least one external electronic device that is connected to the electronic device via a communication network. At operation 302, the electronic device 300 may receive data from the external electronic device via the generated network TUN. The transmitted data at operation 302 may include metadata associated with the data transmitted from the external electronic device to the electronic device 300 via the generated network TUN. The metadata may include at least one of a UID and/or a PID. At operation 303, the electronic device 300 may provide the metadata to at least one application.

Figure 4:
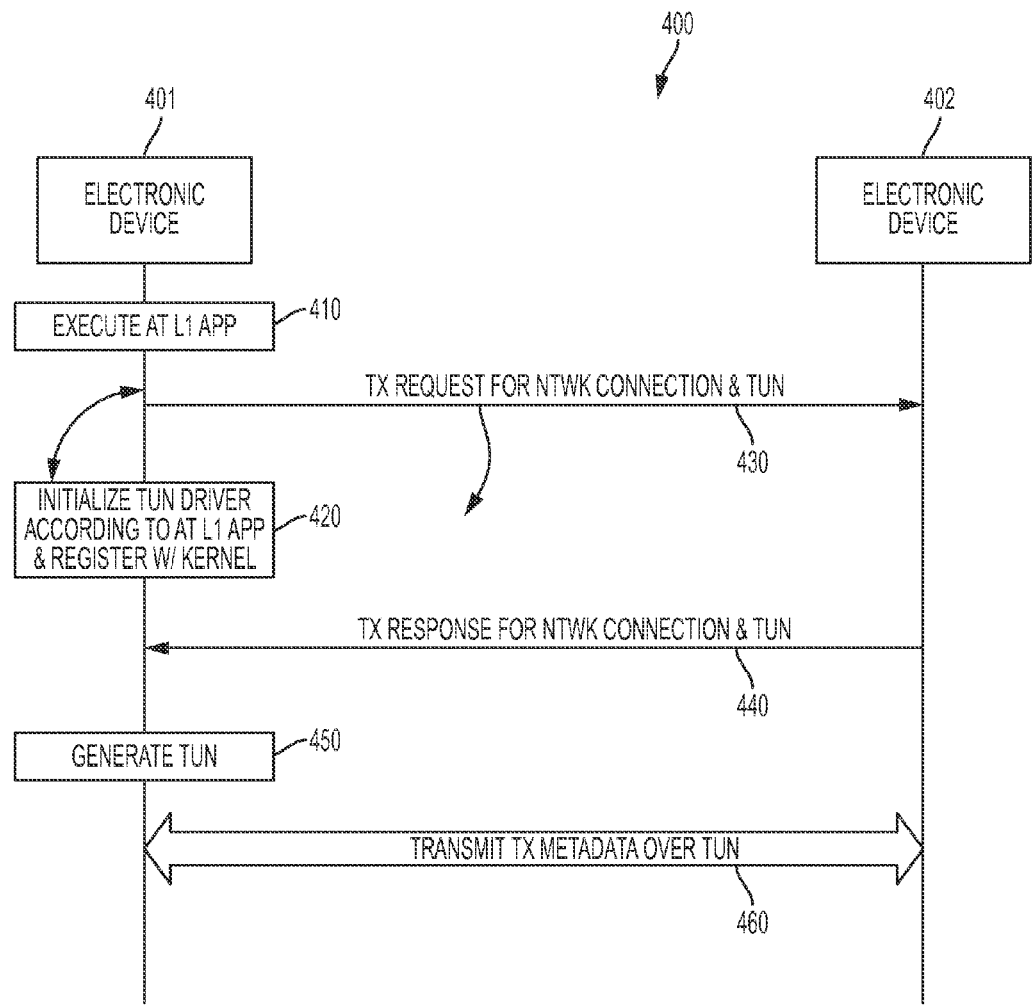
FIG. 4 is a flowchart illustrating a method of generating a network TUN according to an embodiment of the present disclosure.

FIG. 4 is a flowchart illustrating a method of generating a network TUN according to an embodiment of the present disclosure.

Referring to FIG. 4, a method 400 of generating a network TUN may be performed by a first electronic device 401 and a second electronic device 402 that are included in a wired and/or wireless communication network. At operation 410, the first electronic device 401 executes at least one application. At operation 420, the first electronic device 401 initializes a TUN driver and registers the at least one application with the kernel of an OS of the first electronic device 401.

At operation 430, the first electronic device 401 transmits a request for a network connection and a network TUN to the second electronic device 402. The second electronic device 402 receives the request and transmits a response accepting and/or rejecting the request for the network connection and the network TUN. As shown in FIG. 4, at operation 430, the second electronic device 402 transmits the response, so as to accept the request for the network connection and the network TUN, to the first electronic device 401.

At operation 450, the first electronic device 401 generates the network TUN between the first electronic device 401 and the second electronic device 402 according to the response message transmitted by the second electronic device 402. Accordingly, at operation 460, both the first electronic device 401 and the second electronic device 402 may transmit and receive data over the network TUN, wherein metadata, may include at least one of a UID and/or a PID, is provided with network traffic over the network TUN.

Figure 5:
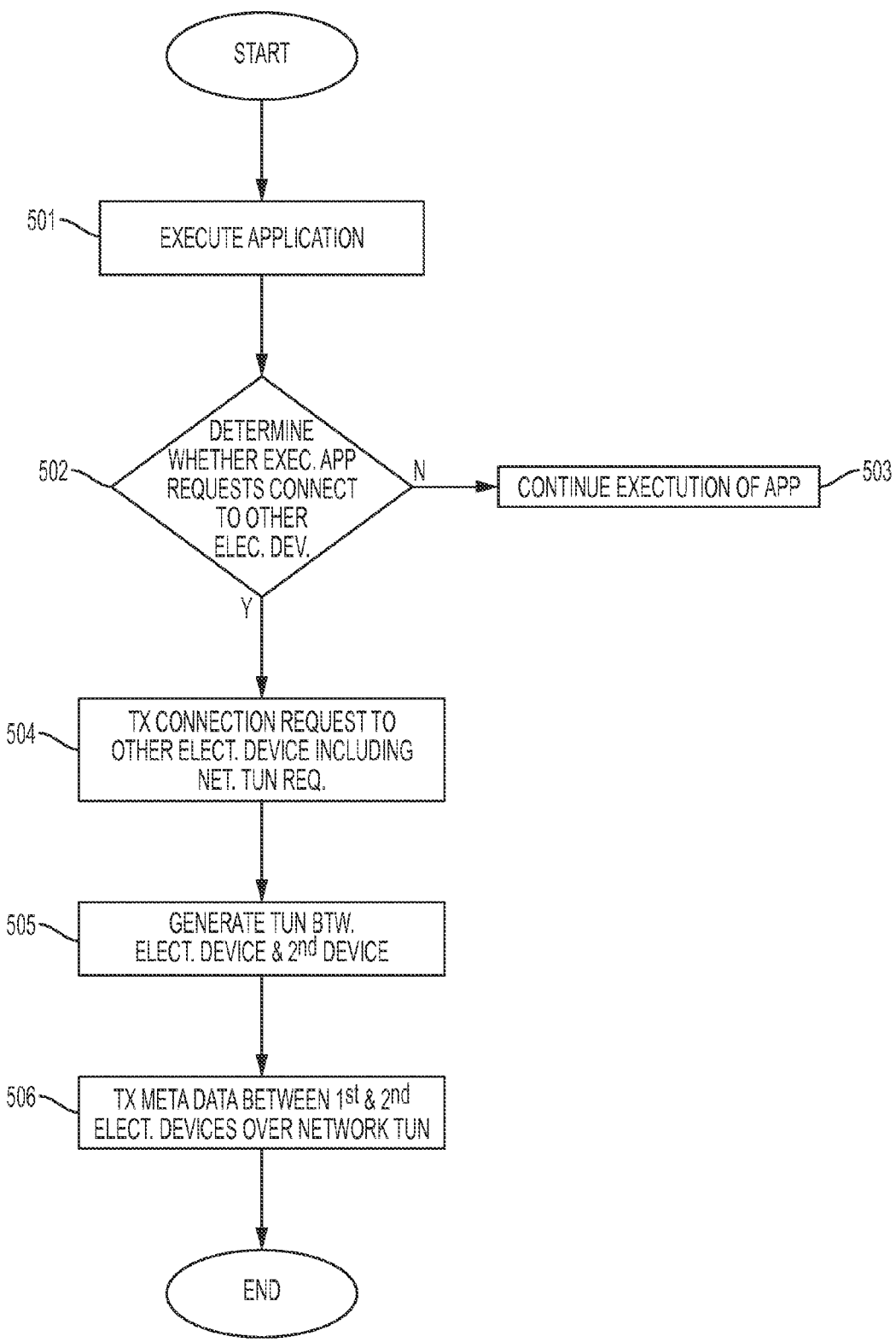
FIG. 5 is a flowchart illustrating a method of transmitting metadata using a network TUN according to an embodiment of the present disclosure.

FIG. 5 is a flowchart illustrating a method of transmitting metadata using a network TUN according to an embodiment of the present disclosure.

Referring to FIG. 5, at operation 501, an electronic device executes at least one application. For example, the electronic device may execute the at least one application according to a user input and/or according to any suitable command to execute the at least one application. Next, at operation 502, the electronic device may determine whether the at least one application requests a connection, including a network TUN, to another electronic device. If, at operation 502, the electronic device determines that it does not request, and/or need, a connection, including the network TUN, to the other electronic device, then, at operation 503, the electronic device may continue execution of the at least one application.

On the other hand, if the electronic device, at operation 502, determines that a connection, including the network TUN, is requested and/or needed by the at least one application, then the electronic device proceeds to operation 504 in order to transmit a connection request to the other electronic device, the connection request including a request for the network TUN. Next, at operation 505 the electronic device generates the network TUN between the electronic device and the other electronic device. Accordingly, at operation 506, the electronic device generates the network TUN between the electronic device and the other electronic device so that both may transmit and receive data over the network TUN, wherein metadata is provided with network traffic that is transmitted between the electronic device and the other electronic device over the network TUN.

Figure 6:
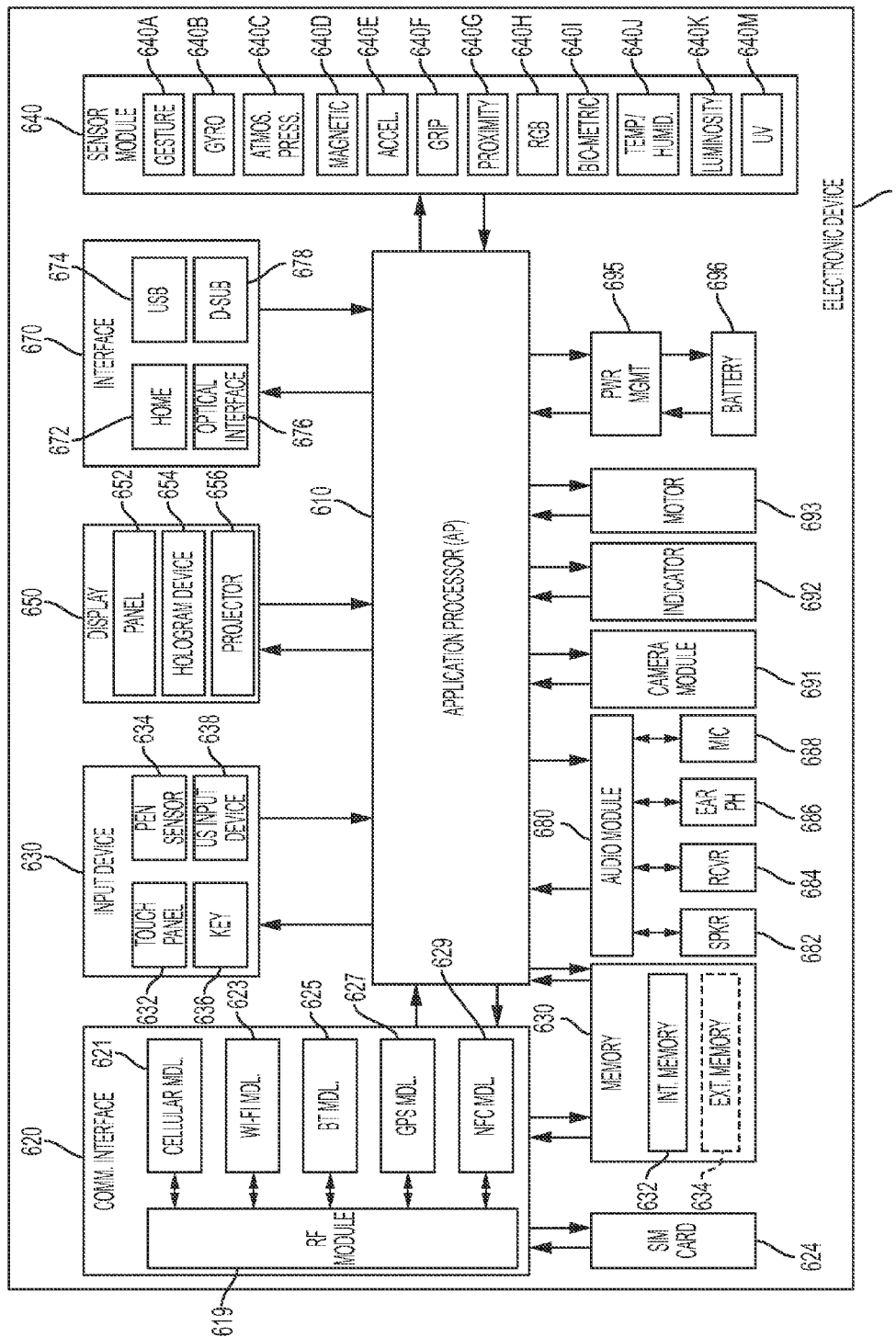
FIG. 6 illustrates a block diagram of hardware according to an embodiment of the present disclosure.

FIG. 6 illustrates a block diagram of hardware according to various embodiments of the present disclosure.

Referring to FIG. 6, hardware 601 may be, for example, a part, or all, of the electronic device 101. Referring to FIG. 6, the hardware 601 may include one or more application processors (AP) 610, a communication module 620, a subscriber identification module (SIM) card 624, a memory 630, a sensor module 640, an input module 650, a display module 660, an interface 670, an audio module 680, a camera module 691, a power management module 695, a battery 696, an indicator 697, a motor 698, and/or the like.

The AP 610 may control one or more hardware or software components that are connected to AP 610, perform processing or computation of data, including multimedia data, and/or the like. As an example, the AP 610 may be implemented as a system-on-chip (SoC). The AP 610 may include a graphics processing unit (GPU) (not shown).

The communication module 620, e.g., the communication interface 160, may transmit and receive data in communications between the electronic device 101 and other electronic devices, e.g., the electronic device 104, the server 106, and/or the like. As an example, the communication module 620 may include one or more of a cellular module 621, a Wi-Fi module 623, a Bluetooth module 625, a GPS module 627, a NFC module 628, a Radio Frequency (RF) module 629, and/or the like.

The cellular module 621 may provide services such as, for example, a voice call, a video call, a short messaging service (SMS), internet service, and/or the like, via a communication network, e.g., LTE, LTE-A, CDMA, WCDMA, UMTS, WiBro, GSM, and/or the like. As an example, the cellular module 621 may differentiate and authorize electronic devices within a communication network using a SIM)card, e.g., the SIM card 624. According to various embodiments of the present disclosure, the cellular module 621 may perform at least a part of the functionalities of the AP 610. For example, the cellular module 621 may perform at least a part of multimedia control functionality.

According to various embodiments of the present disclosure, the communication interface 620 and/or the cellular module 621 may include a communications processor (CP). As an example, the cellular module 621 may be implemented as SoC.

Although FIG. 6 illustrates components such as the cellular module 621, which may be a CP, the memory 630, the power management module 695 as components that are separate from the AP 610, according to various embodiments of the present disclosure, the AP 610 may include, or be integrated with, one or more of the foregoing components, e.g., the cellular module 621.

According to various embodiments of the present disclosure, the AP 610, the cellular module 621, e.g., a CP, and/or the like, may process instructions or data received from at least one of non-volatile memory or other components by loading in volatile memory. The AP 610, the cellular module 621, the communication interface 620, and/or the like, may store at non-volatile memory at least one of data that is received from at least one of other components or data that is generated by at least one of the other components.

Each of the Wi-Fi module 623, the Bluetooth module 625, the GPS module 627, the NFC module 628, and/or the like may, for example, include one or more processors that may process data received or transmitted by the respective modules. Although FIG. 6 illustrates the cellular module 621, the Wi-Fi module 623, the Bluetooth module 625, the GPS module 627, and the NFC module 628 as separate blocks, according to various embodiments of the present disclosure, any combination, e.g., two or more, of the cellular module 621, the Wi-Fi module 623, the Bluetooth module 625, the GPS module 627, the NFC module 628, and/or the like may be included in an Integrated Chip (IC) or an IC package. For example, at least some of the processors corresponding to the respective the cellular module 621, the Wi-Fi module 623, the Bluetooth module 625, the GPS module 627, the NFC module 628, and/or the like, may be implemented as a single SoC. For example, a CP corresponding to the cellular module 621 and a Wi-Fi processor corresponding to Wi-Fi module 623 may be implemented as a single SoC.

The RF module 629 may, for example, transmit and receive RF signals. Although not shown, the RF module 629 may include a transceiver, a power amplifier module (PAM), a frequency filter, a low noise amplifier (LNA), and/or the like. The RF module 634 may include one or more components for transmitting and receiving electro-magnetic (EM) waves, e.g., in free space or the like, such as, for example, conductors or conductive wires. Although FIG. 6 illustrates that the cellular module 621, the Wi-Fi module 623, the Bluetooth module 625, the GPS module 627, and the NFC module 628 are sharing one RF module 629, according to various embodiments of the present disclosure, at least one of the cellular module 621, the Wi-Fi module 623, the Bluetooth module 625, the GPS module 627, the NFC module 628, and/or the like may transmit and receive RF signals via a separate RF module.

The SIM card 624 may be a card implementing a SIM, and may be configured to be inserted into a slot disposed at a specified location of the electronic device. The SIM card 624 may include a unique identifier, e.g., an integrated circuit card identifier (ICCID), subscriber information, e.g., an international mobile subscriber identity (IMSI)), and/or the like.

The memory 630, e.g., the memory 130, may include an internal memory 632, an external memory 634, or a combination thereof.

According to various embodiments of the present disclosure, the internal memory 632 may be, for example, at least one of volatile memory, e.g., dynamic random access memory (DRAM), static random access memory (SRAM) or synchronous dynamic random access memory (SDRAM)), non-volatile memory, e.g., one time programmable read only memory (OTPROM), programmable read only memory (PROM), erasable and programmable read only memory (EPROM), electrically erasable and programmable read only memory (EEPROM), mask read only memory (ROM), flash ROM, NAND flash memory, NOR flash memory, and/or the like.

According to various embodiments of the present disclosure, the internal memory 632 may be a solid state drive (SSD). As an example, the external memory 634 may be a flash drive, e.g., a compact flash (CF) drive, a secure digital (SD) drive, a micro-SD drive, a mini-SD drive, and/or an extreme digital (xD) drive, a memory stick, and/or the like). The external memory 634 may be operatively coupled to electronic device 601 via various interfaces. According to various embodiments of the present disclosure, the electronic device 601 may include recording devices (or recording media) such as, for example, Hard Disk Drives (HDD), and/or the like.

The sensor module 640 may measure physical/environmental properties, may detect operational states associated with electronic device 601, and/or the like, and may convert the measured and/or detected information into signals such as, for example, electric signals or electromagnetic signals. As an example, the sensor module 640 may include at least one of a gesture sensor 640A, a gyro sensor 640B, an atmospheric pressure sensor 640C, a magnetic sensor 640D, an accelerometer 640E, a grip sensor 640F, a proximity sensor 640G, an RGB sensor 640H, a biometric sensor 640I, a temperature/humidity sensor 640J, a luminosity sensor 640K, an ultra violet (UV) sensor 640M, and/or the like. The sensor module 640 may detect the operation state of the electronic device and/or measure physical properties, and convert the detected or measured information into electrical signals. Additionally or alternatively, the sensor module 640 may also include, for example, an electrical-nose sensor (not shown), an electromyography (EMG) sensor (not shown), an electroencephalogram (EEG) sensor (not shown), an infrared (IR) sensor (not shown), an eye-scanning sensor (e.g., iris sensor) (not shown), a fingerprint sensor, and/or the like. The sensor module 640 may also include control circuitry for controlling one or more sensors included therein.

The input module 650 may include a touch panel 652, a pen sensor 654, which may also be referred to as a digital pen sensor 654, a key 656, an ultrasonic input device 658, and/or the like.

As an example, the touch panel 652 may detect touch input using capacitive, resistive, infrared, ultrasonic methods, and/or the like. The touch panel 652 may also include a touch panel controller (not shown). As an example, a capacitive-type touch panel may detect proximity inputs, e.g. a hovering input, in addition to, or as an alternative to, physical touch inputs. The touch panel 652 may also include a tactile layer. According to various embodiments of the present disclosure, the touch panel 652 may provide haptic feedback to the user using the tactile layer.

As an example, the digital pen sensor 654 may be implemented using methods identical to or similar to receiving a touch input from a user, or using a separate detection sheet, e.g., a digitizer.

As an example, the key 656 may be a keypad, a touch key, and/or the like.

As an example, the ultrasonic input device 658 may be a device configured to identify data by detecting, using a microphone, e.g., the microphone 688, ultrasonic signals generated by a device capable of generating the ultrasonic signal. The ultrasonic input device 858 may detect data wirelessly.

According to various embodiments of the present disclosure, the electronic device 601 may receive user input from an external device, e.g., a network, computer or server, connected to the electronic device 601 using the communication module 620.

The display module 660, e.g., the display 150, may include a panel 662, a hologram device 664, a projector 666, and/or the like. As an example, the panel 662 may be, for example, a liquid-crystal display (LCD), an active-matrix organic light-emitting diode (AM-OLED) display, and/or the like. As an example, the panel 662 may be configured to be flexible, transparent, and/or wearable. The panel 662 and the touch panel 652 may be implemented as a single module. The hologram device 664 may provide a three-dimensional image. For example, the hologram device 664 may utilize the interference of light waves to provide a three-dimensional image in empty space. The projector 666 may provide image by projecting light on a surface, e.g., a wall, a screen, and/or the like. As an example, the surface may be positioned internal or external to electronic device 601. According to various embodiments of the present disclosure, the display module 660 may also include a control circuitry for controlling the panel 662, the hologram device 664, the projector 666, and/or the like.

The interface 670 may include, for example, one or more interfaces for a high-definition multimedia interface (HDMI) 672, a universal serial bus (USB) 674, a projector 676, or a D-subminiature (D-sub) 678, and/or the like. As an example, the interface 670 may be part of the communication interface 620. Additionally or alternatively, the interface 670 may include, for example, one or more interfaces for mobile high-definition Link (MHL), a SD/MultiMedia Card (MMC), Infrared Data Association (IrDA), and/or the like.

The audio module 680 may encode/decode sound into electrical signal, and vice versa. According to various embodiments of the present disclosure, at least a portion of audio module 680 may be part of the I/O interface 140. As an example, the audio module 680 may encode/decode voice information that is input into, or output from, the speaker 682, the receiver 684, the earphone 686, the microphone 688, and/or the like.

The camera module 691 may capture still images and/or video. According to various embodiments of the present disclosure, the camera module 691 may include one or more image sensors, e.g., a front sensor module, a rear sensor module, and/or the like, (not shown), an image signal processor (ISP) (not shown), or a flash, e.g., a light-emitting diode such as a flash LED, xenon lamp, and/or the like (not shown).

The power management module 695 may manage electrical power of the electronic device 601. Although not shown, the power management module 695 may include, for example, an integrated circuit (IC), a power management IC (PMIC), a charger IC, a battery gauge, a fuel gauge, and/or the like.

As an example, the PMIC may be disposed in an integrated circuit or an SoC semiconductor. The charging method for the electronic device 601 may include wired or wireless charging. The charger IC may charge a battery, may prevent excessive voltage or excessive current from a charger from entering the electronic device 601, and/or the like. According to various embodiments of the present disclosure, the charger IC may include at least one of a wired charger IC or a wireless charger IC. As an example, the wireless charger IC may be a magnetic resonance type, a magnetic induction type, an electromagnetic wave type, and/or the like. As an example, the wireless charger IC may include circuits such as a coil loop, a resonance circuit, a rectifier, and/or the like.

As an example, the battery gauge may measure a charge level, a voltage while charging, a temperature of battery 696, and/or the like.

As an example, the battery 666 may supply power to the electronic device 601. As an example, the battery 696 may be a rechargeable battery, a solar battery, and/or the like.

The indicator 697 may indicate one or more states, e.g., boot status, message status, charge status, and/or the like, of the electronic device 601 or a portion thereof, e.g., the AP 610. A motor 698 may convert an electrical signal into a mechanical vibration.

Although not shown, the electronic device 601 may include one or more devices for supporting mobile television, which may also be referred to as mobile TV, e.g., a GPU, and/or the like. The devices for supporting mobile TV may support processing of media data compliant with, for example, digital multimedia broadcasting (DMB), digital video broadcasting (DVB), media flow, and/or the like.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs and/or software modules, the one or more programs comprising instructions, which when executed by one or more processors in an electronic device, cause the electronic device to perform a method of the present disclosure.

Any such software may be stored in the form of volatile or non-volatile storage such as, for example, a storage device like a read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are noted intended to limit the scope of the present disclosure. Accordingly, the scope of the present disclosure should be understood as to include any and all modifications that may be made without departing from the technical spirit of the present disclosure.

What is claimed is:

1. A method for providing metadata with network traffic, the method comprising:
generating, by at least one processor at an electronic device, a network tunnel between the electronic device and at least one external electronic device that communicates with the electronic device via a communication network;
receiving, by a transceiver of the electronic device, data generated by at least one application and metadata of the at least one application generating the data, from the external electronic device via the network tunnel, wherein the metadata of the at least one application generating the data is stripped from the data and at least a portion of the stripped metadata is added as a metadata packet header of the application generated data before receipt by the transceiver;
determining the at least one application that generated the received application generated data using the metadata packet header; and
providing respective services on the data using the determined at least one application,
wherein the receiving of the data, including the metadata of the at least one application generating the received data, comprises receiving the metadata header, and
wherein the receiving of the metadata header comprises receiving sk_buff information including fields corresponding to the information of the metadata.

2. The method of claim 1, wherein the metadata includes at least one of a user identifier (UID) or a process identifier (PID).

3. The method of claim 2, further comprising differentiating, by the at least one processor at the electronic device, the received data based on the at least one application generating the received data.

4. The method of claim 3, wherein the differentiating of the received data comprises differentiating the received data according to at least one of the UID or the PID.

5. The method of claim 3, further comprising providing the respective services on the differentiated data based on the metadata of the at least one application generating the received data.

6. The method of claim 3, further comprising transmitting the differentiated data to respective destinations based on the metadata of the at least one application generating the received data.

7. The method of claim 1, wherein the receiving of the sk_buff information comprises receiving at least one of a field including the UID or another field including the PID.

8. A method of an electronic device for providing metadata with network traffic, the method comprising:
determining, by at least one processor at the electronic device, whether an application that is executed on the electronic device requests a network tunnel (TUN) connection to another electronic device;
transmitting, by a transceiver at the electronic device, a request for the network TUN connection to the other electronic device if the network TUN is requested;
receiving, by the transceiver at the electronic device, from the other electronic device, a response to the request for the network TUN;
generating, by the at least one processor at the electronic device, a network TUN between the electronic device and the other electronic device according to the response;
at least one of transmitting data or receiving data and metadata associated with at least one application of the other electronic device via the network TUN,
wherein the metadata associated with the at least one application of the other electronic device is stripped from the data and at least a portion of the stripped metadata is added as a metadata packet header of the application generated data before transmitting by the transceiver or receiving by the transceiver, wherein the metadata is based on the application that is executed on the electronic device or the at least one application of the other electronic device, wherein the at least one of the transmitting of the data or the receiving of the data and metadata associated with at least one application of the other electronic device comprises at least one of transmitting or receiving the metadata header, and wherein the transmitting of or the receiving of the metadata header comprises at least one of transmitting or receiving sk_buff information including fields corresponding to the information of the metadata;

determining the at least one application that generated the received application generated data using the metadata packet header; and providing respective services on the data using the determined at least one application that generated the transmitted data or the received data.

9. The method of claim 8, wherein the metadata includes at least one of a user identifier (UID) or a process identifier (PID).

10. The method of claim 9, further comprising differentiating at least one of the transmitted data or the received data based on the application generating the transmitted data or the received data.

11. The method of claim 10, wherein the differentiating of at least one of the transmitted data or the received data comprises differentiating the at least one of the transmitted data or the received data according to at least one of the UID or the PID.

12. The method of claim 10, further comprising providing the respective services on the differentiated data based on the metadata.

13. The method of claim 10, further comprising transmitting the differentiated data to respective destinations based on the metadata of the application generating the received data.

14. The method of claim 8, wherein the at least one of the transmitting of or the receiving of the sk_buff information comprises at least one of transmitting or receiving at least one of a field including the UID or another field including the PID.

15. An electronic device for providing metadata with network traffic, the electronic device comprising:

at least one processor configured to generate a network tunnel between the electronic device and at least one external electronic device that communicates with the electronic device via a communication network; and a transceiver configured to:
receive data generated by at least one application and metadata of the at least one application generating the data, from the external electronic device via the network tunnel, wherein the metadata of the at least one application generating the data comprises a metadata header, and wherein the metadata header comprises sk_buff information including fields corresponding to the information of the metadata, wherein the metadata of the at least one application generating the data is stripped from the data and at least a portion of the stripped metadata is added as a packet of the data before receipt by the transceiver, and wherein the at least one processor is further configured to:
determine the at least one application that generated the received application generated data using the metadata packet header, and provide respective services on the data using the determined at least one application.

16. The electronic device of claim 15, wherein the metadata includes at least one of a user identifier (UID) or a process identifier (PID).

17. The electronic device of claim 16, wherein the at least one processor is further configured to differentiate the received data based on the at least one application generating the received data.

18. The electronic device of claim 17, wherein the at least one processor is further configured to differentiate the received data according to at least one of the UID or the PID.

19. The electronic device of claim 17, wherein the at least one processor is further configured to provide the respective services on the differentiated data based on the metadata of the at least one application generating the received data.

20. The electronic device of claim 17, wherein the transceiver is further configured to transmit the differentiated data to respective destinations based on the metadata of the at least one application generating the received data.

21. The electronic device of claim 15, wherein the transceiver is further configured to receive at least one of a field including the UID or another field including the PID.

* * * * *